United States Patent
Karbassian et al.

(10) Patent No.: US 7,677,094 B1
(45) Date of Patent: Mar. 16, 2010

(54) METHOD AND SYSTEM FOR TESTING ROAD LOAD DURABILITY OF TRUCK REAR BED

(75) Inventors: Ali Karbassian, Windsor (CA); Darren Bonathan, Wayne, MI (US); Tetsufumi Katakami, Tokyo (JP)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 58 days.

(21) Appl. No.: 12/241,224

(22) Filed: Sep. 30, 2008

(51) Int. Cl.
*G01M 17/02* (2006.01)
(52) U.S. Cl. ........................ 73/146
(58) Field of Classification Search ........... None
See application file for complete search history.

(56) References Cited

U.S. PATENT DOCUMENTS

| | | | | |
|---|---|---|---|---|
| 3,911,737 A | * | 10/1975 | Ormond | 73/862.629 |
| 5,154,076 A | * | 10/1992 | Wilson et al. | 73/116.06 |
| 5,663,494 A | * | 9/1997 | Clayton et al. | 73/116.06 |
| 5,861,552 A | * | 1/1999 | Clayton et al. | 73/116.06 |
| 7,174,776 B2 | | 2/2007 | Temkin et al. | |
| 2003/0114995 A1 | * | 6/2003 | Su et al. | 702/34 |
| 2004/0254772 A1 | * | 12/2004 | Su | 703/8 |
| 2005/0273277 A1 | * | 12/2005 | Ridnour et al. | 702/42 |
| 2006/0059993 A1 | * | 3/2006 | Temkin et al. | 73/669 |
| 2007/0245828 A1 | | 10/2007 | Nakajima et al. | |
| 2007/0261469 A1 | * | 11/2007 | Friske et al. | 73/11.08 |

OTHER PUBLICATIONS

Chiba et al., "Fatigue Strength Prediction of Truck Cab by CAE", Technical Review No. 15, 2003, pp. 52-58, Japan.

* cited by examiner

*Primary Examiner*—Andre J Allen
(74) *Attorney, Agent, or Firm*—Global IP Counselors, LLP

(57) ABSTRACT

A method for testing road load durability of a truck rear bed includes calculating road pseudo fatigue damage on the rear bed based on road load data indicative of loads imparted on the rear bed while the truck is traveling on a proving road, determining a cyclic input applied to a rear bed assembly mounted on a bench test stand with the rear bed assembly being separated from at least a cab of the truck so that bench test pseudo fatigue damage on the rear bed that is substantially equivalent to the road pseudo fatigue damage is achieved by the cyclic input, and performing a durability bench test of the rear bed by applying the cyclic input to the rear bed assembly mounted on the bench test stand with the rear bed assembly being separated from at least the cab.

20 Claims, 11 Drawing Sheets

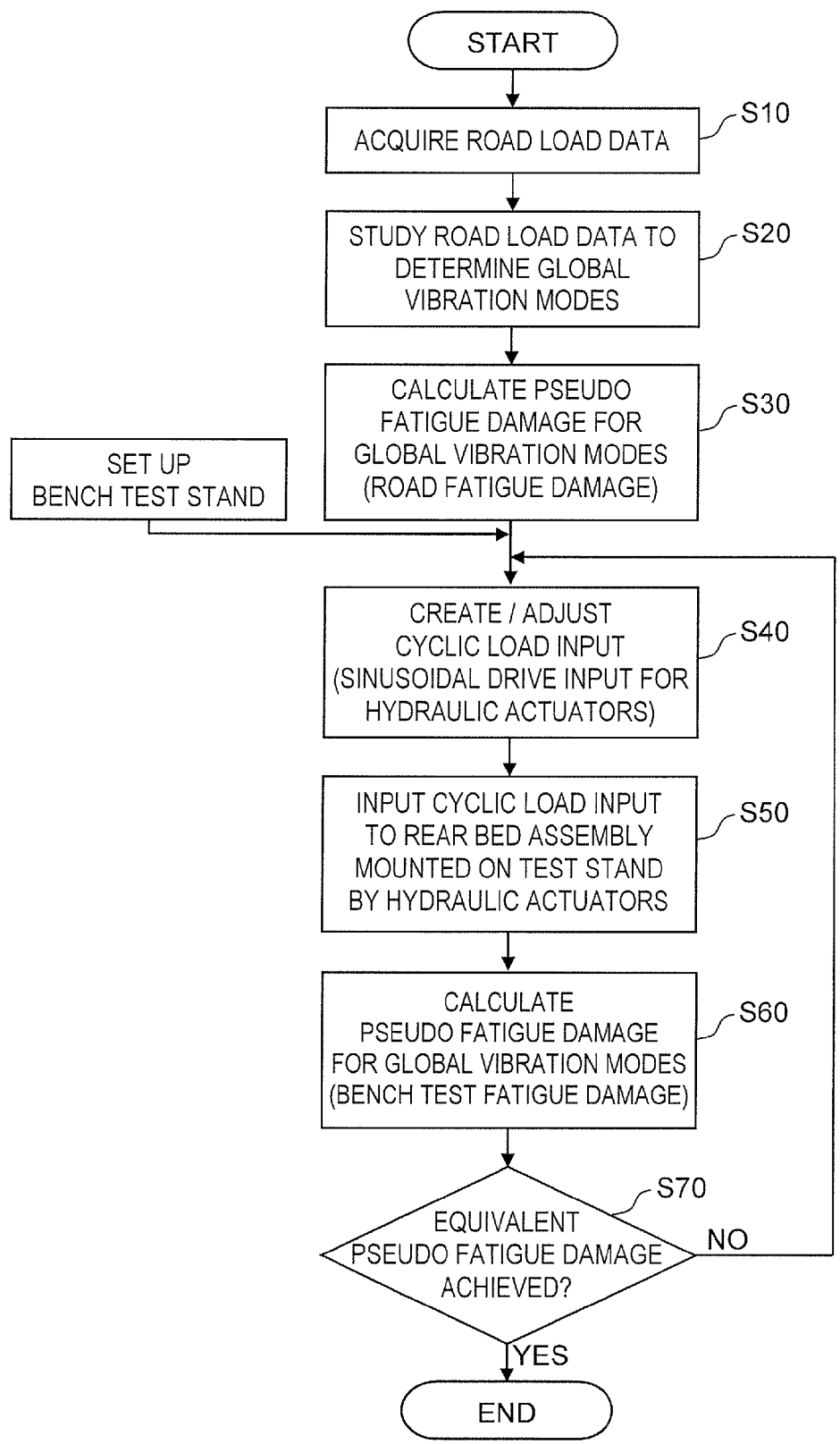
F I G. 3

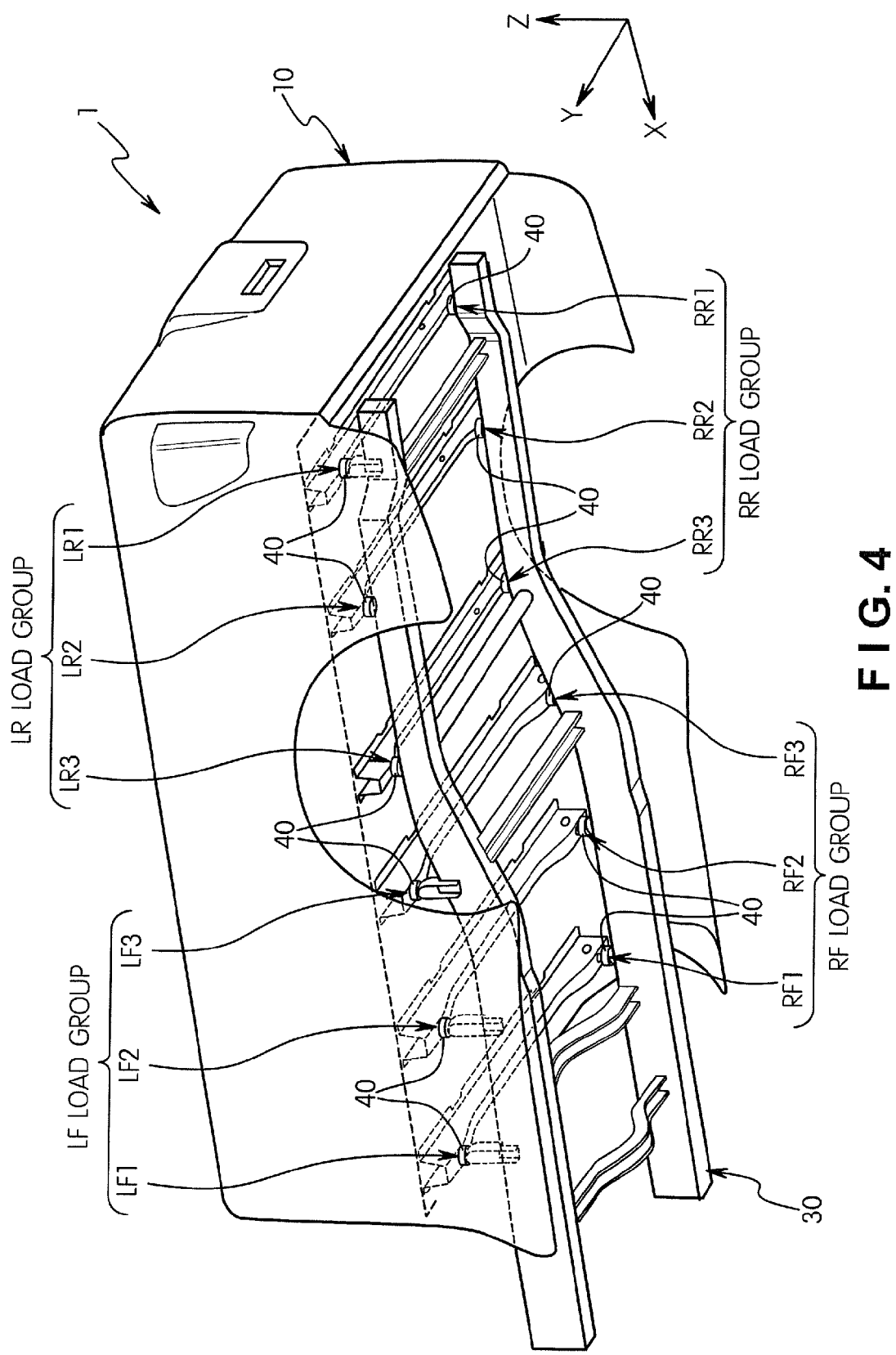
F I G. 4

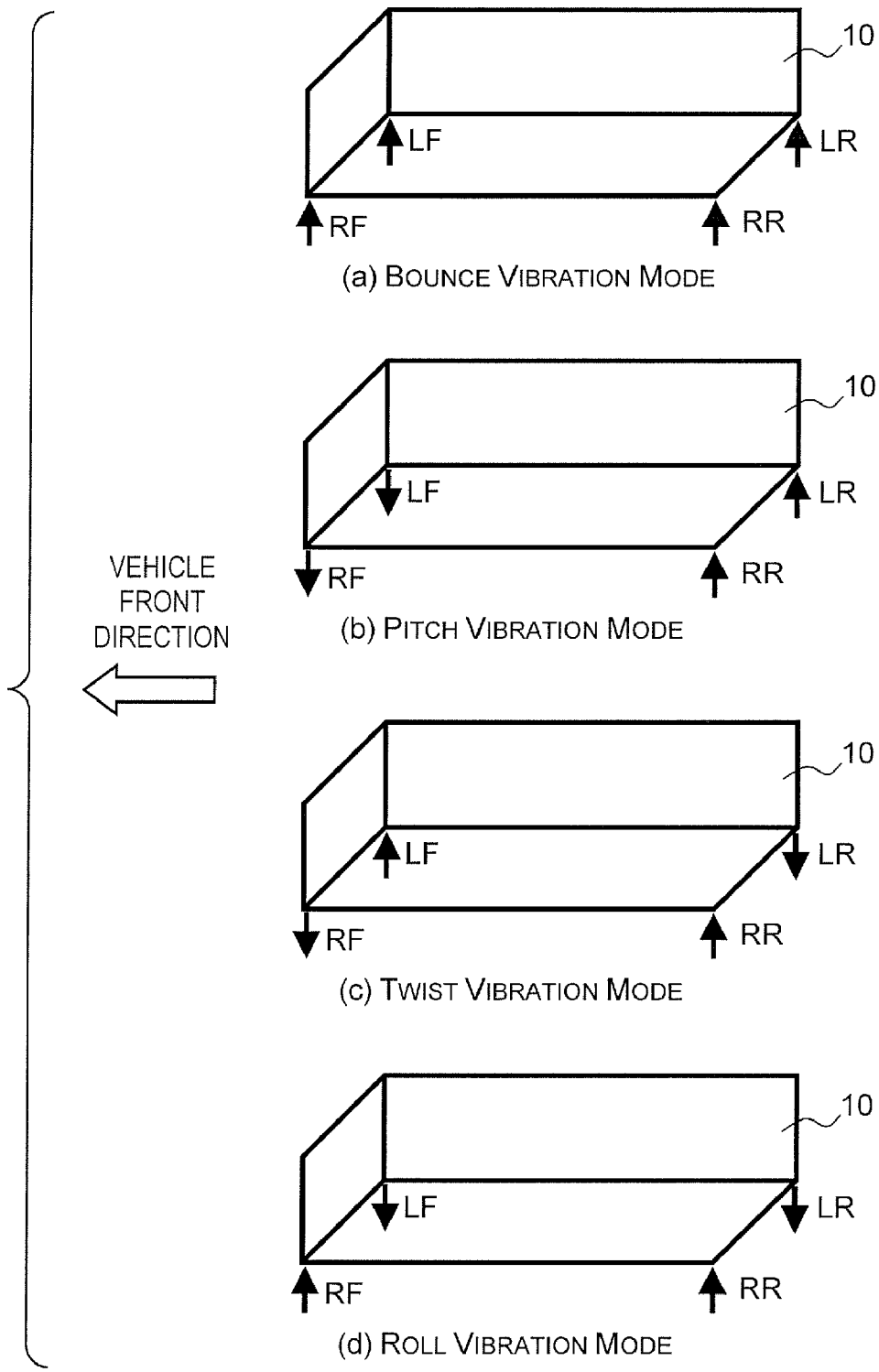
F I G. 6

| Vibration Mode | # of Cycles per Mode* | Relative Global Modes Load Damage, Bench Test vs. PG Vehicle Loads** | | | |
| --- | --- | --- | --- | --- | --- |
| | | Bounce | Pitch | Twist | Roll |
| Bounce 2 mm Input | 238 | 95% | 25% | 36% | 0% |
| Pitch 2 mm Input | 0 | 0% | 0% | 0% | 0% |
| Twist 6 mm Input | 99 | 2% | 24% | 62% | 10% |
| Roll 2 mm Input | 870 | 3% | 64% | 2% | 90% |
| Total Relative Damage | | 100% | 113% | 100% | 100% |

FIG. 12

METHOD AND SYSTEM FOR TESTING ROAD LOAD DURABILITY OF TRUCK REAR BED

BACKGROUND OF THE INVENTION

1. Field of the Invention

The present invention relates to a method for testing road load durability of a rear bed of a truck and a system for testing road load durability of a rear bed of a truck.

2. Background Information

Vehicle body durability testing is an important part of the vehicle development process that evaluates vehicle body structure reliability with respect to long-term road load input. Currently, there are two types of testing method for evaluating durability of a vehicle body, namely, a proving ground test and a road simulator test (bench test). With the proving ground test, a prototype vehicle, and driven on a proving ground for a long period of time (e.g., for several months). With the road simulator test, a prototype vehicle instrumented with various sensors is driven on a proving ground for a relatively short period of time (e.g., for one week) to acquire road load data. Then, a simulator drive file is developed based on the road load data, and the prototype vehicle is tested on a conventional 4-poster road simulator (or other types of road simulator) using the simulator drive files. The conventional methods described above require a complete vehicle (full vehicle) be tested. Therefore, the conventional durability testing methods are costly (i.e. cost of complete prototype vehicles and operational costs) and time consuming. Moreover, the cost and time spent in these conventional durability testing methods become even greater when pickup trucks are developed, mainly due to the variation of cab, bed and wheel base combinations.

In view of the above, it will be apparent to those skilled in the art from this disclosure that there exists a need for an improved test method for the road load durability of a truck rear bed. This invention addresses this need in the art as well as other needs, which will become apparent to those skilled in the art from this disclosure.

SUMMARY OF THE INVENTION

Component level durability testing is one of the alternatives that can be used in order to reduce the development costs. However, it is very important to create test methods that cover most of the loading scenarios that a vehicle part could possibly encounter in the field. There are several approaches to vibration testing at the component level. Sine-sweep within a specified frequency, random vibration and shock testing are some of the methods used for this purpose. However, the only way to ensure the validity of these component level tests is to reproduce the same failure modes as the vehicle level (complete vehicle) test.

Accordingly, one object of the present invention is to develop an alternative test method for road load durability evaluations of a rear bed of a truck, which does not require a complete vehicle for determining the durability of a truck rear bed.

In order to achieve the above mentioned object, a method for testing road load durability of a truck rear bed includes calculating road pseudo fatigue damage on the rear bed based on road load data indicative of loads imparted on the rear bed while the truck is traveling on a proving road, determining a cyclic input applied to a rear bed assembly mounted on a bench test stand with the rear bed assembly being separated from at least a cab of the truck so that bench test pseudo fatigue damage on the rear bed that is substantially equivalent to the road pseudo fatigue damage is achieved by the cyclic input, and performing a durability bench test of the rear bed by applying the cyclic input to the rear bed assembly mounted on the bench test stand with the rear bed assembly being separated from at least the cab.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 3 is a flowchart for explaining a methodology for developing cyclic load inputs for the truck rear bed road load durability testing method in accordance with the illustrated embodiment;

FIG. 4 is an underside perspective view of the rear bed assembly for explaining grouping of the load cells into a plurality of load groups in accordance with the illustrated embodiment;

FIG. 6 is a series of vibrational mode diagrams (a) to (d) for explaining motion of the rear bed in a plurality of global vibration modes in accordance with the illustrated embodiment;

FIG. 12 is a table showing an example of a comparison result between the pseudo fatigue damage calculated based on the road load data and the bench test load data in accordance with the illustrated embodiment.

DETAILED DESCRIPTION OF THE PREFERRED EMBODIMENTS

Selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
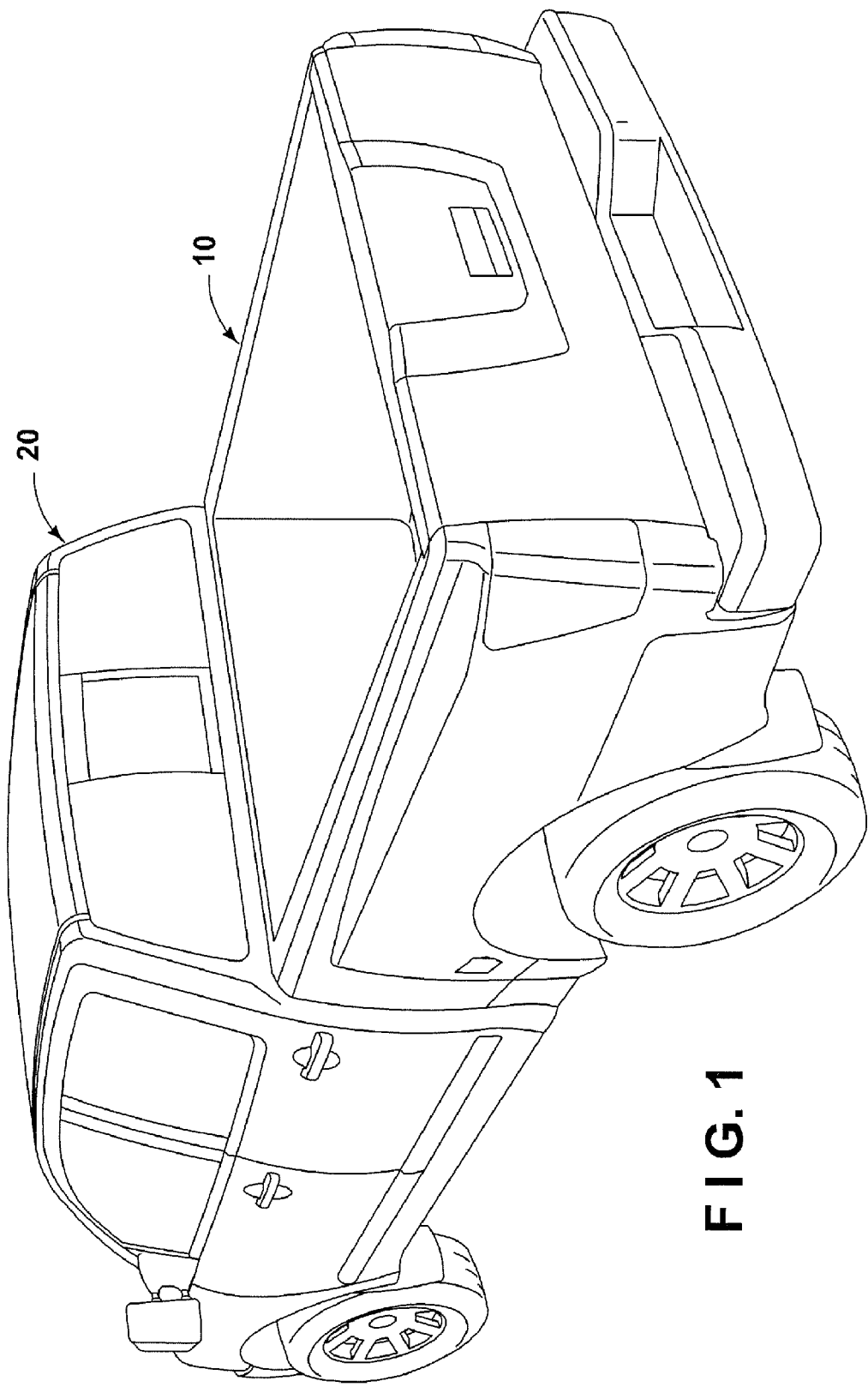
FIG. 1 is a rear perspective view of a pickup truck including a rear bed for which a road load durability is tested by a truck rear bed road load durability testing method in accordance with an illustrated embodiment of the present invention.
Figure 2:
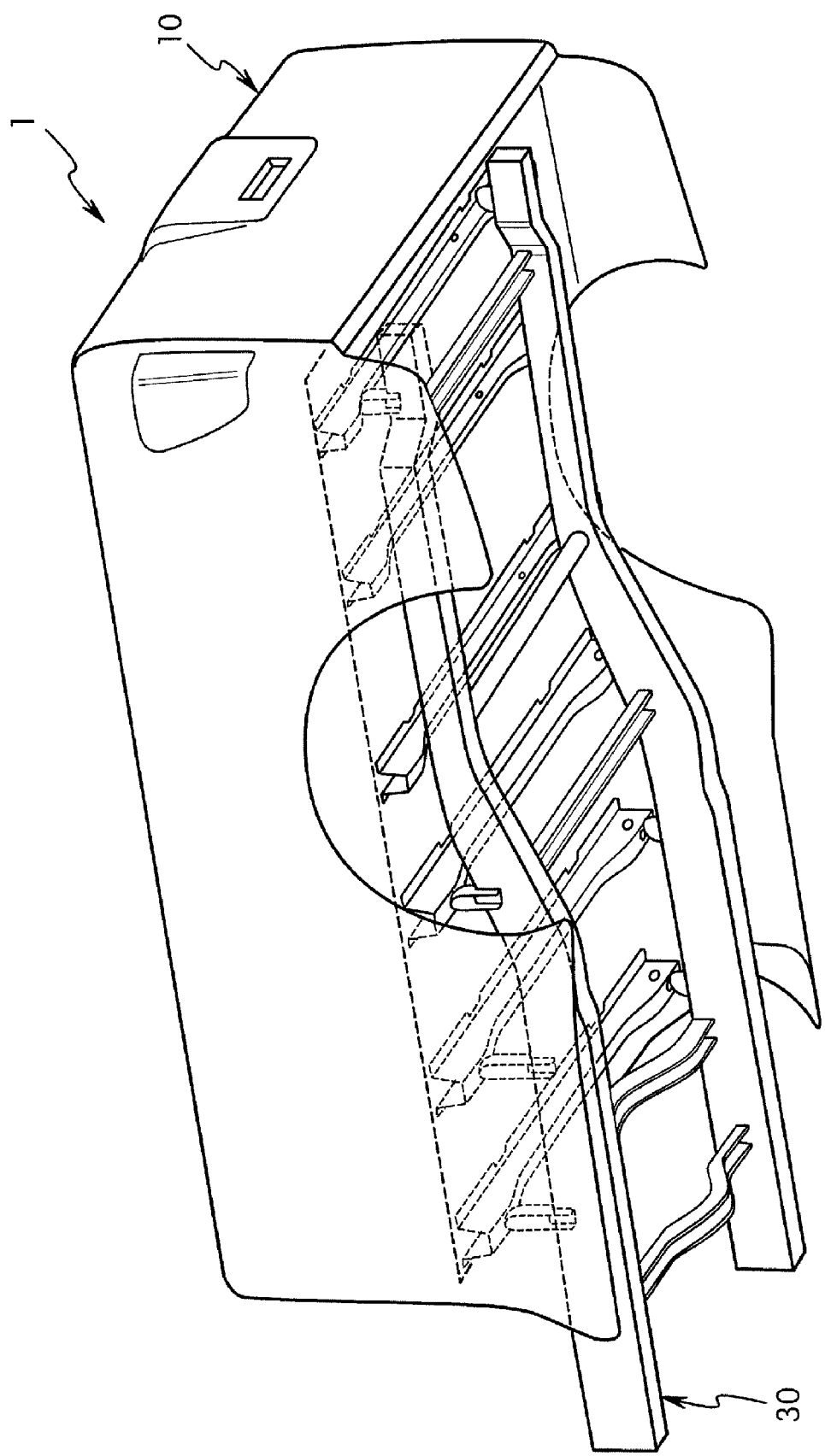
FIG. 2 is an underside perspective view of a rear bed assembly used to evaluate the road load durability of the rear bed by the truck rear bed road load durability testing method in accordance with an illustrated embodiment of the present invention.

FIG. 1 is a rear perspective view of a pickup truck, while FIG. 2 is an underside perspective view of a rear bed assembly 1 for use in a truck rear bed durability testing method as discussed below. As shown in FIG. 1, a segmented body of the pickup truck generally includes a rear bed 10 and a cab 20. The rear bed 10 of the pickup truck, which will be used to attain actual load input is identical to the rear bed of the rear bed assembly 1. Thus, the same reference numeral will be used for the rear bed of the pickup truck and the rear bed assembly 1. Also, the rear bed assembly 1 has a truncated vehicle frame 30, which is identical to the rear frame of the pickup truck, except that the front half of the frame has been removed in the rear bed assembly 1. A truck rear bed road load durability testing method according to the illustrated embodiment is arranged to evaluate the road load durability of the rear bed 10 of the pickup truck by performing a component level vibration test on a bench test stand. More specifically, with the truck rear bed road load durability testing method according to the illustrated embodiment, only the rear bed assembly 1 including the rear bed 10 and the truncated vehicle frame 30 (a rear half of the vehicle frame) as shown in FIG. 2 needs to be tested on the bench test stand by imparting cyclic load inputs to the rear bed assembly 1.

Therefore, the truck rear bed road load durability testing method according to the illustrated embodiment can reduce the need for testing a full (complete) vehicle on a proving road or a road simulator (such as a conventional 4-poster road simulator) each time the road load durability of the truck rear bed is evaluated. Thus, the truck rear bed durability testing method according to the illustrated embodiment can reduce the number of tests that will be required for future development of the pickup truck. Moreover, the truck rear bed road load durability testing method according to the illustrated embodiment is quicker and less expensive as compared to the conventional 4-poster road simulator test that requires a full vehicle be tested, while the truck rear bed road load durability testing method according to the illustrated embodiment can produce the similar durability test results as the conventional 4-poster road simulator test.

As mentioned above, the truck rear bed durability testing method according to the illustrated embodiment is arranged to generate similar test results to the conventional vehicle level test, such as a 4-poster road simulator, by inputting the cyclic load inputs to the rear bed assembly 1 mounted on the bench test stand. The cyclic load inputs imparted on the rear bed assembly 1 during the durability bench test will vary depending on configuration of the rear bed 10 including, for example, a model of the pickup truck on which the rear bed 10 is mounted, whether the rear bed 10 has a long wheel base or a short wheel base, etc. Therefore, in the illustrated embodiment, prescribed cyclic load inputs are developed for each type of a rear bed of a pickup truck prior to the bench test for evaluating the road load durability of the particular type of the rear bed. The cyclic load input can be developed according to the methodology illustrated in a flowchart of FIG. 3.

In step S10 of FIG. 3, actual road load input data including strain/stress data are acquired with a focus on a rear bed while an instrumented pickup truck is driven on a proving ground. In step S20, the acquired road load input data is analyzed to determine major vibration modes (global vibration modes). In step S30, pseudo fatigue damage for each of the major vibration modes is calculated based on the road load data acquired in step S10. While the process in steps S10 to S30 is performed, the bench test stand including a plurality of hydraulic actuators is set up. In step S40, sinusoidal drive inputs (sinusoidal load components) for the hydraulic actuators are created for each of the global vibration modes based on the actual road load input data acquired in step S10. In step S50, the cyclic load inputs are applied to the rear bed assembly 1 mounted on the bench test stand by using the sinusoidal drive inputs for the hydraulic actuators. In step S60, pseudo fatigue damage for each of the global vibration modes is calculated based on the detection results from the sensors installed in the rear bed assembly 1. In step S70, it is determined whether the pseudo fatigue damage calculated based on the bench test data in step S60 is substantially equivalent to the pseudo fatigue damage calculated based on the actual road data in step S30 for each of the global vibration modes. The process in steps S40 to S70 is repeated until the pseudo fatigue damage calculated based on the bench test data in step S60 is substantially equivalent to the pseudo fatigue damage calculated based on the actual road data in step S30 for each of the global vibration modes. When, in step S70, the pseudo fatigue damage calculated in step S60 is determined to be substantially equivalent to the pseudo fatigue damage calculated in step S30 for each of the global vibration modes, the sinusoidal drive inputs are set as target drive inputs for the hydraulic actuators for the truck rear bed road load durability bench test. Once the target drive inputs are determined according to the above method, the truck rear bed road load durability bench test can be performed to evaluate the road load durability of a truck rear bed by applying the target drive inputs to the hydraulic actuators.

The process in steps S10 to S70 is preferably performed by using a controller or controllers that preferably constitute a cyclic input calculating unit. Such controller or controllers preferably include a microcomputer. The controller or controllers can also include other conventional components such as an input interface circuit, an output interface circuit, and storage devices such as a ROM (Read Only Memory) device and a RAM (Random Access Memory) device. The memory circuit stores processing results and control programs that are run by the processor circuit. The controller or controllers are operatively coupled to the various sensors (via data loggers or the like) and hydraulic actuators in a conventional manner. It will be apparent to those skilled in the art from this disclosure that the precise structure and algorithms for the controller or controllers can be any combination of hardware and software that will carry out the functions of the present invention.

Referring now to FIGS. 4 to 12, the process performed in steps S10 to S70 of FIG. 3 for developing the cyclic load inputs for the truck rear bed road load durability bench test will be explained in more detail.

Road Load Data Acquisition

In step S10, an actual road load input to the rear bed 10 is measured while the pickup truck is traveling on the proving ground. The pickup truck is instrumented for road load data acquisition with a focus on the rear bed 10. More specifically, a plurality of load cells 40 is installed at a plurality of mounting points (contacting points) between the rear bed 10 and the vehicle frame 30 (frame rails) of the pickup truck to detect the load imparted to the rear bed 10 through the vehicle frame 30.

As mentioned above, the rear bed durability testing method according to the illustrated embodiment performs a component level bench test using only the rear bed assembly 1 that includes the rear bed 10 and the rear half of the vehicle frame 30. In other words, several components (such as a vehicle suspension) usually disposed in the vicinity of the rear bed 10 are eliminated from the rear bed assembly 1 that is tested on the bench stand. Thus, the mass of the rear bed assembly 1 is not similar to those in a full vehicle since not all the mass components are present in a case of the rear bed assembly 1 as compared to the full vehicle. The fatigue damage to the rear bed 10 is usually caused by load or force imparted on the rear bed 10. Therefore, with the truck rear bed road load durability testing method according to the illustrated embodiment, load inputs to the rear bed 10 are detected by the load cells 40 to ensure that substantially the same fatigue damage as the full vehicle level test occurs on the component level bench test.

Figure 5:
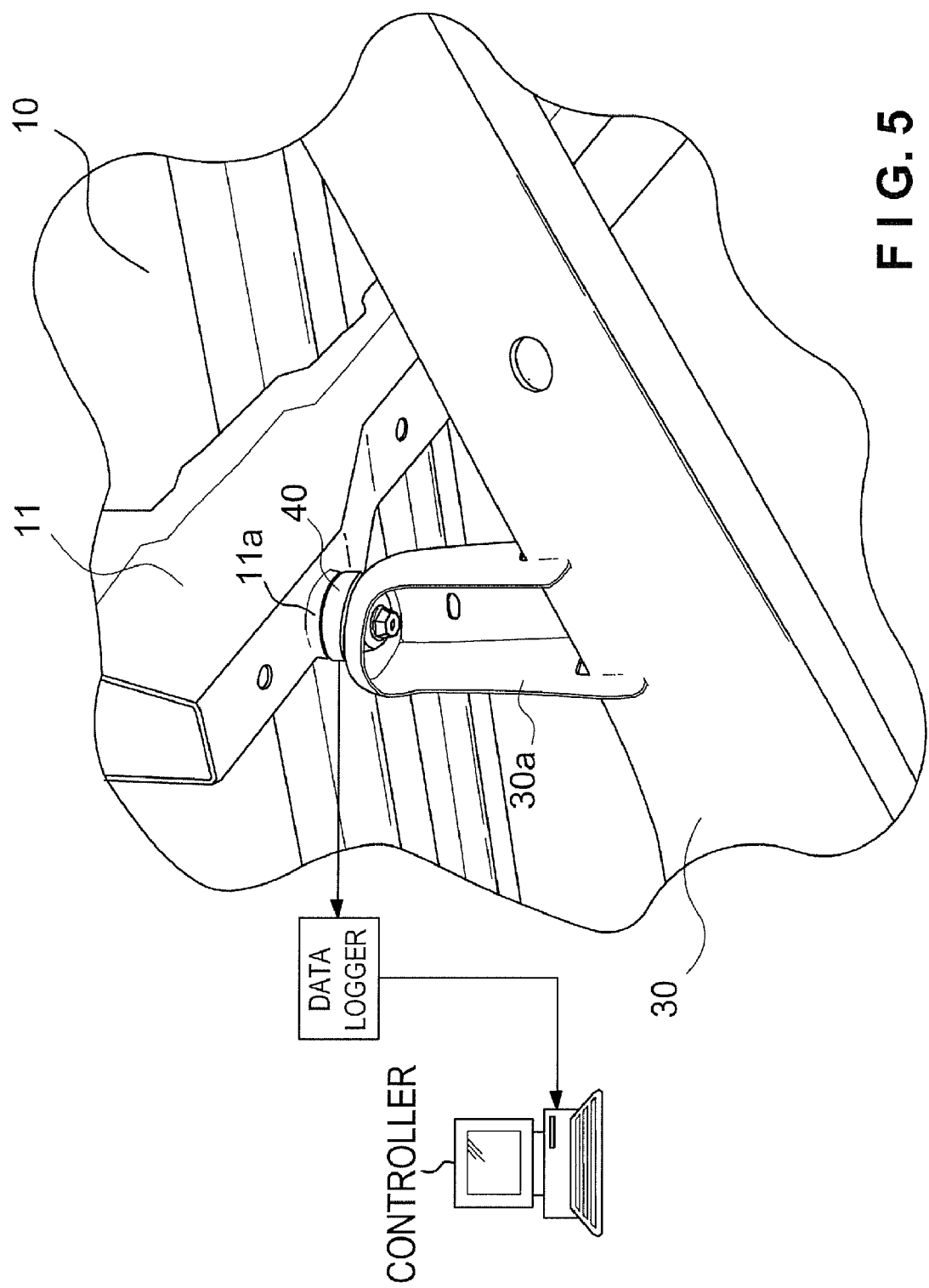
FIG. 5 is an enlarged partial perspective view of the underside of the rear bed assembly showing a load cell disposed at a mounting point between the rear bed and a vehicle frame in accordance with the illustrated embodiment.

In the illustrated embodiment, a total of twelve load cells 40 (i.e., six load cells 40 on each side of the rear bed 10) are preferably installed at the mounting points between the rear bed 10 and the vehicle frame 30 to detect loads inputted to the rear bed 10 through the vehicle frame 30. More specifically, as shown in FIG. 4, the load cells 40 are mounted at the left hand front mounting points LF1, LF2 and LF3, the right hand front mounting points RF1, RF2 and RF3, the left hand rear mounting points LR1, LR2 and LR3 and the right hand rear mounting points RR1, RR2 and RR3. FIG. 5 illustrates one of the mounting points between the rear bed 10 and the vehicle frame 30 at which the load cell 40 is installed. As shown in FIG. 5, the load cell 40 is fixedly coupled between a mounting portion 30a of the vehicle frame 30 and a mounting portion 11a of a cross member 11b formed on a bottom surface of the rear bed 10. For example, conventional tri-axis load cells can be used as the load cells 40. It has been shown that the vertical load inputs detected by the load cells 40 greatly affect the truck rear bed during the proving road test. Therefore, although the tri-axis load cells are used in the illustrated embodiment, only a vertical component (Z component) of the load detected by each of the load cells 40 is used for test development according to the illustrated embodiment. Other load components (X component and Y component) are acquired only for purposes of reference and comparison. It will be apparent to those skilled in the art from this disclosure that the number of the load cells 40 provided in the rear bed assembly 1 is not limited to twelve as disclosed in the illustrated embodiment. More specifically, the number of the load cells 40 depends on the design of the truck rear bed (e.g., the number of contact points between the rear bed and the frame).

In addition to the load cells 40, the pickup truck is also instrumented with various sensors that are conventionally used to measure and calculate fatigue damage on the rear bed 10. For example, the truck rear bed twist data and strain/stress at major joints on the rear bed 10 can also be acquired in this step for subsequent correlation studies. One or more twist transducers 50 (FIG. 8) and one or more conventional strain gauges are preferably installed in prescribed locations on the rear bed 10 to capture bed strain/stress data and bed twist data during the proving ground test. A plurality of conventional accelerometers can be installed at a plurality of bed mounting points on both the frame rail of the vehicle frame 30 and the rear bed 10.

The instrumented pickup truck is driven on the proving ground to collect the road load data for a prescribed number of laps of the proving roads. The movement of the pickup truck on the proving ground causes loading at the mounting points between the rear bed 10 and the vehicle frame 30 and these loads are captured by the load cells 40 and recorded for subsequent analysis. Also, the detection results from the accelerometers, the strain gauges, and the twist transducers 50 during the proving ground test are also recorded for subsequent analysis.

Global Vibration Modes Analysis

In step S20, the actual road load input data captured by the load cell 40 during the proving ground test is analyzed in both the frequency domain and the time domain to determine major vibration modes. More specifically, frequencies that cause majority of fatigue damage in the vehicle upper body in typical road load durability tests are mainly below 40 Hz. In such frequency range, the truck rear bed vibration modes can be simplified to a limited number of major vibration modes, including bounce vibration mode, pitch vibration mode, twist vibration mode and roll vibration mode. These major vibration modes are referred as global vibration modes (as opposed to local vibration).

FIG. 6 shows schematic diagrams (a) to (d) explaining movements of the rear bed 10 in each of the global vibration modes. As shown in the diagram (a) of FIG. 6, in the bounce vibration mode, all four corners (i.e., the left-front corner LF, the right-front corner RF, the left-rear corner LR, and the right-rear corner RR) of the rear bed 10 move together vertically. In the pitch vibration mode shown in the diagram (b) of FIG. 6, the left-front corner LF and the right-front corners RF of the rear bed 10 vibrate in vertical direction together and the left-rear corner RF and the right rear corner RR vibrate in vertical direction 180° out of phase with respect to the left-front corner LF and the right-front corner RF. In the twist vibration mode shown in the diagram (c) of FIG. 6, a first set of diagonal corners (i.e., the left-front corner LF and the right-rear corner RR) vibrate in vertical direction together and a second set of the diagonal corners (i.e., the right-front corner RF and the left-rear corner LR) vibrate in vertical direction 180° out of phase with respect to the first set. In the roll vibration mode shown in the diagram (d) of FIG. 6, the left-front corner LF and the left-rear corner LR of the rear bed 10 vibrate in vertical direction together and the right-front corner RF and the right-rear corner RR vibrate in vertical direction 180° out of phase with respect to the left-front corner LF and the left-rear corner LR.

As mentioned above, in the illustrated embodiment, a total of twelve load cells 40 are provided in the mounting points between the rear bed 10 and the vehicle frame 30 as shown in FIG. 4. Thus, the load input data is collected through twelve data channels in the illustrated embodiment. In order to calculate the global vibration modes (i.e., the bounce vibration mode, the pitch vibration mode, the twist vibration mode and the roll vibration mode) as described above, the twelve data channels are integrated into four groups corresponding to the left-front corner LF, the right-front corner RF, the left rear corner LR and the right-rear corner RR of the rear bed 10. In other words, the load data captured by the load cells 40 at mounting points that are physically close together are grouped into a left-front (LF) load group, a right-front (RF) load group, a left-rear (LR) load group and a right-rear (RR) load group. More specifically, as shown in FIG. 4, the load input data (vertical load data) from the load cells 40 at the left hand front mounting points LF1, LF2 and LF3 are grouped together to form the LF load group (i.e., LF Load Group: LF1+LF2+LF3). The load input data (vertical load data) from the load cells 40 at the right hand front mounting points RF1, RF2 and RF3 are grouped together to form the RF load group (i.e., RF Load Group: RF1+RF2+RF3). The load input data (vertical load data) from the load cells 40 at the left hand rear mounting points LR1, LR2 and LR3 are grouped together to form the LR load group (i.e., LR Load Group: LR1+LR2+LR3). The load input data (vertical load data) from the load cells 40 at the right hand rear mounting points RR1, RR2 and RR3 are grouped together to form the RR load group (i.e., RR Load Group: RR1+RR2+RR3).

Then, the load input data of the LF load group, the RF load group, the LR load group and the RR load group are used to form a virtual data channel corresponding to each of the global vibration modes (i.e., the bounce vibration mode, the pitch vibration mode, the roll vibration mode and the twist vibration mode). More specifically, the virtual data channels corresponding to the global vibration modes are formed according to the following formulas (1) to (4).

Bounce Data Channel:

$$(\text{LF load group} + \text{RF load group} + \text{LR load group} + \text{RR load group}) \quad (1)$$

Pitch Data Channel:

$$(\text{LF load group} + \text{RF load group}) - (\text{LR load group} + \text{RR load group}) \quad (2)$$

Twist Data Channel:

$$(\text{LF load group} + \text{RR load group}) - (\text{RF load group} + \text{LR load group}) \quad (3)$$

Roll Data Channel:

$$(\text{LF load group} + \text{LR load group}) - (\text{RF load group} + \text{RR load group}) \quad (4)$$

As mentioned above, in the illustrated embodiment, the vertical load (Z components) detected by the load cell 40 at each mounting point between the rear bed 10 and the vehicle frame 30 is used in all calculations for the global vibration modes.

Pseudo Fatigue Damage Calculation

In step S30, the acquired road load data is analyzed in both frequency and time domains to quantify the global vibration modes (the bounce vibration mode, the pitch vibration mode, the roll vibration mode and the twist vibration mode), and to quantify each mode contribution to the rear bed fatigue damage (road pseudo fatigue damage). Also, in this step, a dominant frequency is determined by analyzing the road load data. More specifically, the dominant frequency is determined using the pseudo fatigue damage calculation of different strain gauge channels that are installed on the rear bed 10. For example, if the calculation of the pseudo fatigue damage based on the acquired road load data reveals the majority of rear bed pseudo fatigue damage is accumulated around the frequency of 7.5 Hz, this frequency is set as the dominant frequency.

The fatigue damage is calculated as a function of several parameters such as a type of material, stress and strain concentration factors, etc. Thus, the precise fatigue damage calculation will change for each system (bench test stand). In the illustrated embodiment, the road pseudo fatigue damage for the global vibration modes is calculated based on the road load data by using the generic stress life or load life fatigue damage algorithm with prescribed standard material properties. For example, in the illustrated embodiment, the RPC software (e.g., "Damage Cycle" tool) by MTS Systems Corporation (Eden Prairie, Minn.) can be used to calculate the fatigue damage based on the road load input data acquired in the proving ground test.

Bench Test Stand Set Up

Referring now to FIGS. 7 to 10, a system for testing road load durability of a rear bed of a truck (the bench test stand) according to the illustrated embodiment will be explained in detail. The bench test stand is constructed to perform a component level durability test using the rear bed assembly 1, which includes the rear bed 10 and a rear half of the vehicle frame 30 as shown in FIG. 2.

Figure 7:
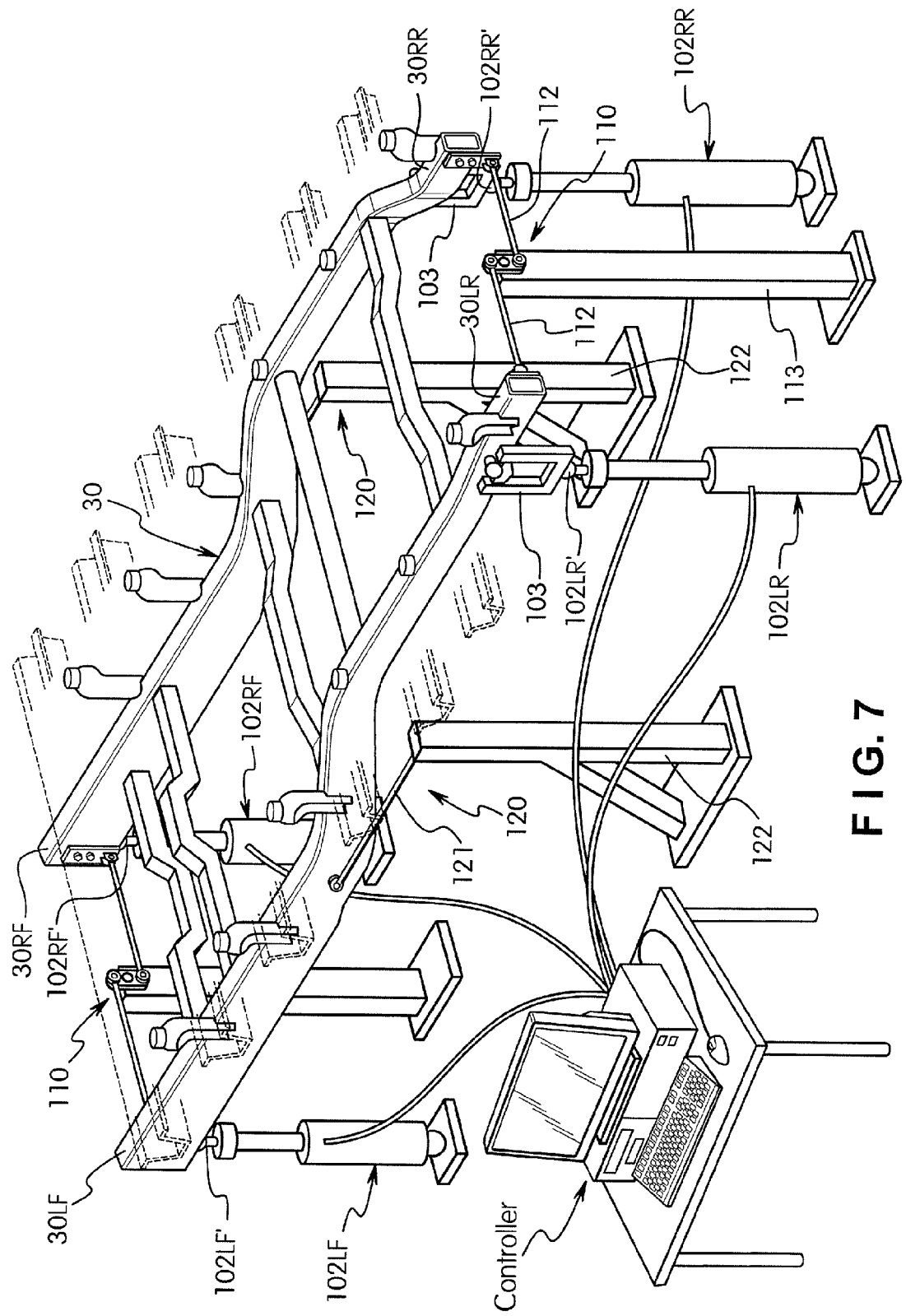
FIG. 7 is a simplified rear perspective view of a system (bench test stand) for testing road load durability of a rear bed of a truck in accordance with the illustrated embodiment, with the rear bed of the rear bed assembly being omitted.

FIG. 7 is a simplified rear perspective view showing an overall configuration of the bench test stand in accordance with the illustrated embodiment. In FIG. 7, the rear bed 10 in the rear bed assembly 1 is omitted, and only the vehicle frame 30 is shown in order to better understand the configuration of the bench test stand. The bench test stand according to the illustrated embodiment has four single-axis hydraulic actuators including a left-front hydraulic actuator 102LF, a right-front hydraulic actuator 102RF, a left-rear hydraulic actuator 102LR and a right-rear hydraulic actuator 102RR as shown in FIG. 7. As mentioned above, since the vertical load inputs (Z components) detected by the load cells 40 greatly affect the truck rear bed during the proving road test, excitation to the rear bed assembly 1 can be simplified only to vertical load inputs by the hydraulic actuators 102LF, 102RF, 102LR and 102RR.

The left-front hydraulic actuator 102LF includes a left-front attachment part 102LF' configured and arranged to be coupled to a left-front portion 30LF of the vehicle frame 30 of the rear bed assembly 1 to apply a vertical load input to the left-front portion of the rear bed assembly 1. The right-front hydraulic actuator 102RF includes a right-front attachment part 102RF' configured and arranged to be coupled to a right-front portion 30RF of the vehicle frame 30 of the rear bed assembly 1 to apply a vertical load input to the right-front portion of the rear bed assembly 1. The left-rear hydraulic actuator 102LR includes a left-rear attachment part 102LR' configured and arranged to be coupled to a left-rear portion 30LR of the vehicle frame 30 of the rear bed assembly 1 to apply a vertical load input to the left-rear portion of the rear bed assembly 1. The right-rear hydraulic actuator 102RR includes a right-rear attachment part 102RR' configured and arranged to be coupled to a right-rear portion 30RR of the vehicle frame 30 of the rear bed assembly 1 to apply a vertical load input to the right-rear portion of the rear bed assembly 1.

More specifically, the left-rear attachment portions 102LR' of the left-rear hydraulic actuator 102LR and the right-rear attachment portions 102RR' of the right-rear hydraulic actuator 102RR are preferably attached to leaf spring rear mounting brackets 103 coupled to left-rear portion 30LR and right-rear portion 30RR of the vehicle frame 30 as shown in FIG. 7. The left-front attachment portion 102LF' of the left-front hydraulic actuator 102LF and the right-front attachment portion 102RF' of the right-front hydraulic actuator 102RF are preferably attached to left-front portion 30LF and right-front portion 30RF of the vehicle frame 30 via brackets or the like at positions immediately forward of the rear bed 10, for example, at the rear most cab mounting locations. These attachment structures and test fixtures in the bench test stand are designed and fabricated so that they withstand the loads for the course of durability test, for example, as described in G. A. Shinkle, "Automotive Component Vibration: A Practical Approach to Accelerated Vibration Durability Testing", SAE International Congress and Exposition, Detroit, Mich., 1984.

A bottom end of each of the hydraulic actuators 102LF, 102RF, 102LR and 102RR is movably supported on the ground via a movable damping joint in order to dissipate kinetic energy caused by the operation of the hydraulic actuators 102LF, 102RF, 102LR and 102RR. Also, a top end of each of the hydraulic actuators 102LF, 102RF, 102LR and 102RR is supported to the vehicle frame 30 of the rear bed assembly 1 via a flexible joint with minimal dampening effect. The flexible joints are configured and arranged so that minimal energy dissipation is achieved between the hydraulic actuators 102LF, 102RF, 102LR and 102RR and the vehicle frame 30.

The bench test stand further includes a pair of lateral restraint mechanisms 110 and a pair of longitudinal restraint mechanisms 120 to limit relative displacement between the hydraulic actuators 102LF, 102RF, 102LR and 102RR.

Figure 9:
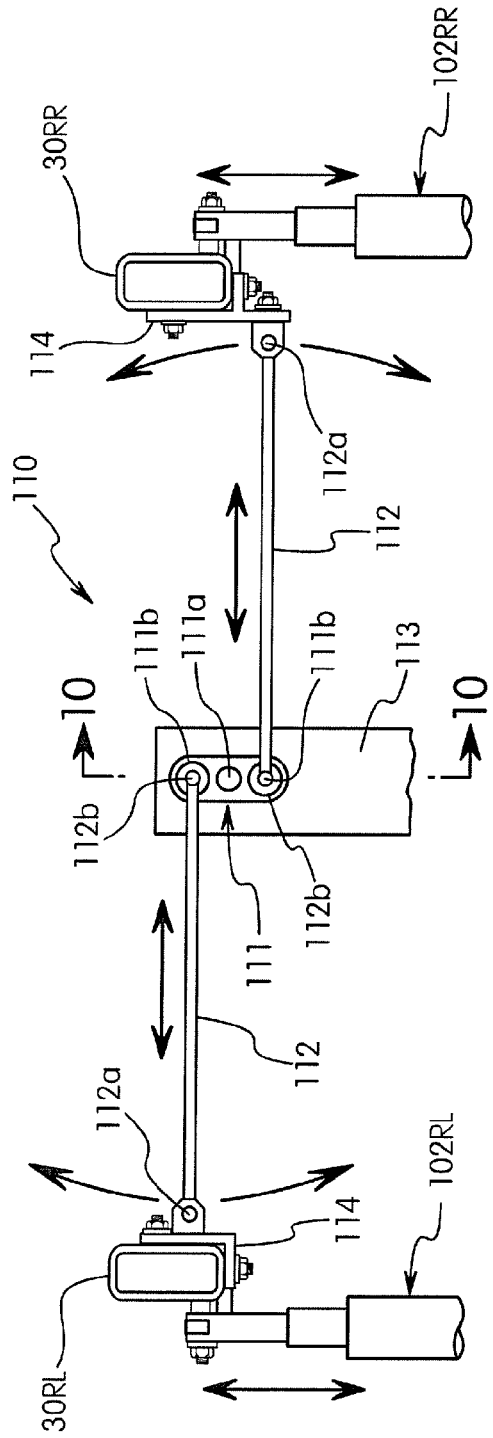
FIG. 9 is a front elevational view of a lateral restraint mechanism of the bench test stand in accordance with the illustrated embodiment.
Figure 10:
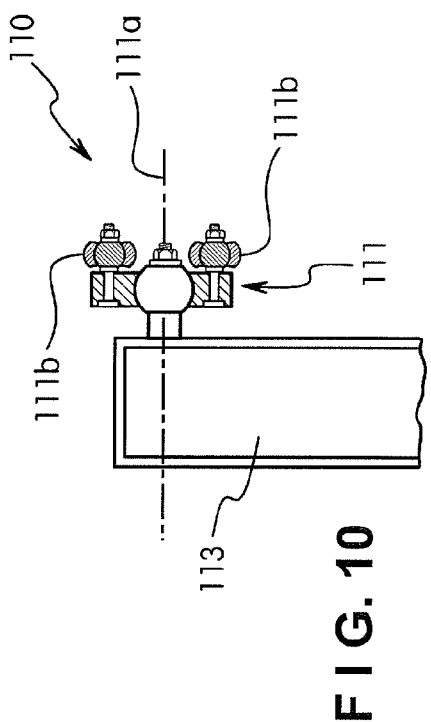
FIG. 10 is a cross sectional view of the lateral restraint mechanism of the bench test stand in accordance with the illustrated embodiment as taken along a section line 10-10 in FIG. 9.

The lateral restraint mechanisms 110 are disposed between the left-front hydraulic actuator 102LF and the right-front hydraulic actuator 102RF, and between the left-rear hydraulic actuator 102LR and the right-rear hydraulic actuator 102RR. Each of the lateral restraint mechanisms 110 is arranged as a Watts linkage mechanism. More specifically, as shown in FIGS. 9 and 10, the lateral restraint mechanism 110 includes a center link member 111 and a pair of rod members 112. The center link member 111 extends generally vertically, and is pivotally coupled to a fixed member 113 around a center pivot axis 111a. The fixed member 113 is fixed to the ground. The center link member 111 has a pair of vertically aligned rod attachment portions 111b with the center pivot axis 111a being disposed therebetween. The rod members 112 extend generally horizontally. The rod members 112 each has an outer end 112a pivotally coupled the rear bed assembly 1 and an inner end 112b pivotally coupled to a respective one of the rod attachment portions 111b of the center link member 111. With the lateral restraint mechanism 110 disposed between the left-front hydraulic actuator 102LF and the right-front hydraulic actuator 102RF, the outer ends 112a of the rod members 112 are preferably pivotally coupled to the brackets that connect the left-front and right-front attachment parts 102LF' and 102RF' of the left-front and right-front hydraulic actuators 102LF and 102RF to the left-front and right-front portions 30LF and 30RF of the vehicle frame 30. With the lateral restraint mechanism 110 disposed between the left-rear hydraulic actuator 102LR and the right-rear hydraulic actuator 102RR, the outer ends 112a of the rod members 112 are preferably pivotally attached to the left-rear portion 30LR and the right-rear portion 30RR of the vehicle frame 30 via brackets 114. The lateral restraint mechanisms 110 are preferably arranged with respect to the rear bed assembly 1 so that the instantaneous centers for each of the Watts linkage mechanisms (the lateral restraint mechanisms 110) is disposed adjacent to the roll axis of a ballasted vehicle.

Figure 8:
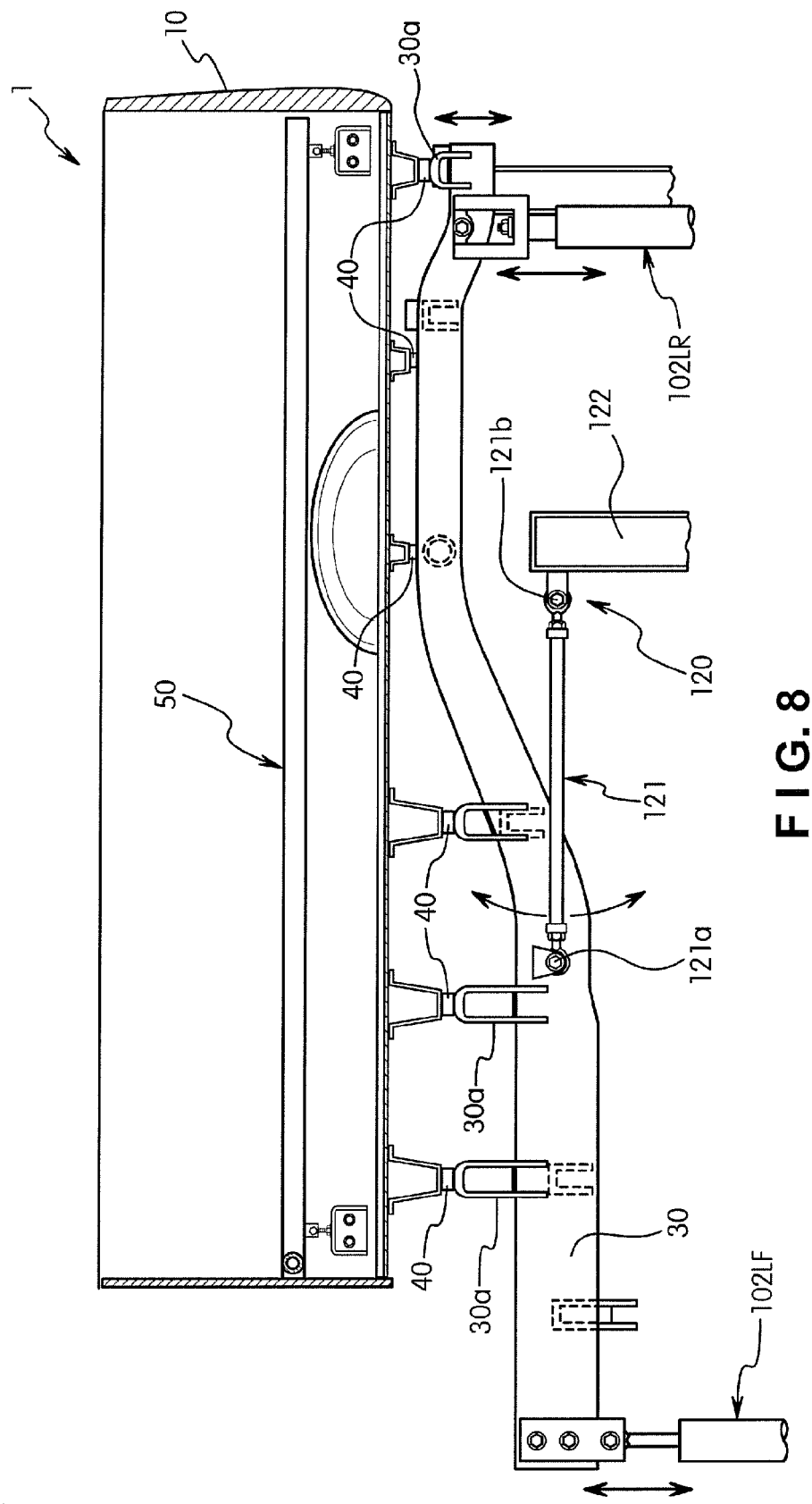
FIG. 8 is a partial side cross sectional view of the rear bed assembly mounted on the bench test in accordance with the illustrated embodiment.

The longitudinal restraint mechanisms 120 are arranged on left and right sides of the bench test stand as shown in FIGS. 7 and 8. Each of the longitudinal restraint mechanisms 120 includes a rod member 121 that extends aft to a wheel centerline. The rod member 121 has a front end 121a pivotally connected to the vehicle frame 30 of the rear bed assembly 1, and a rear end 121b pivotally connected to a fixed member 122 as shown in FIG. 8. The fixed member 122 is fixed to the ground.

Creation of Sinusoidal Drive Inputs for Hydraulic Actuators

Referring now to the flowchart of FIG. 3, in steps S40 to S70, sinusoidal drive inputs (waveforms) for the hydraulic actuators 102LF, 102RF, 102LR and 102RR for applying the cyclic load inputs to the rear bed assembly 1 for performing the truck rear bed road load durability bench test are developed in an iterative process. During the truck rear bed road load durability bench test, the sinusoidal drive inputs are used to independently control the hydraulic actuators 102LF, 102RF, 102LR and 102RR to impart cyclic load inputs (vertical load) to the rear bed assembly 1 mounted on the bench test stand described above. More specifically, the hydraulic actuators 102LF, 102RF, 102LR and 102RR are independently controlled to simulate or reproduce motions (vibrations) in each of the global vibration modes (i.e., the bounce vibration mode, the pitch vibration mode, the twist vibration mode and the roll vibration mode) as shown in FIG. 6 experienced by the rear bed 10 in the proving ground test in step S10.

In order to perform correlation analysis to determine the sinusoidal drive inputs, the instrumented rear bed assembly 1 that was used for the road load data acquisition in step S10 is preferably installed on the hydraulic actuators 102LF, 102RF, 102LR and 102RR of the bench test stand. The load cells 40, the strain gauges and the twist transducers 50 (FIG. 8) are preferably installed in the rear bed assembly 1 in the same manner as in the proving ground test in step S10 as described above.

In selection of the bench test sinusoidal drive inputs, both the pseudo damage values and rear bed load response magnitudes collected during the proving ground test are considered. The frequency of the sinusoidal drive inputs is determined through road load data analysis in step S30. More specifically, the frequency of the sinusoidal drive inputs is determined using the pseudo fatigue damage calculation of different strain gauge channels that are installed on the rear bed 10 performed in step S30. The strain gauge channels are additional channels that are installed on the rear bed 10 for road load data acquisition in step S10. The frequency line with the most damage accumulation is selected for the bench test. More specifically, the dominant frequency of vibration of the rear bed 10 (e.g., 7.5 Hz in this embodiment) determined in step S30 based on the road load data acquired in the proving ground test is preferably set as the frequency of the sinusoidal drive inputs in step S40. Moreover, number of cycles in each of the global vibration modes is also determined according to each mode contribution to the rear bed fatigue damage and correlation study of the pseudo fatigue damages between the proving ground test and the bench test.

Figure 11:
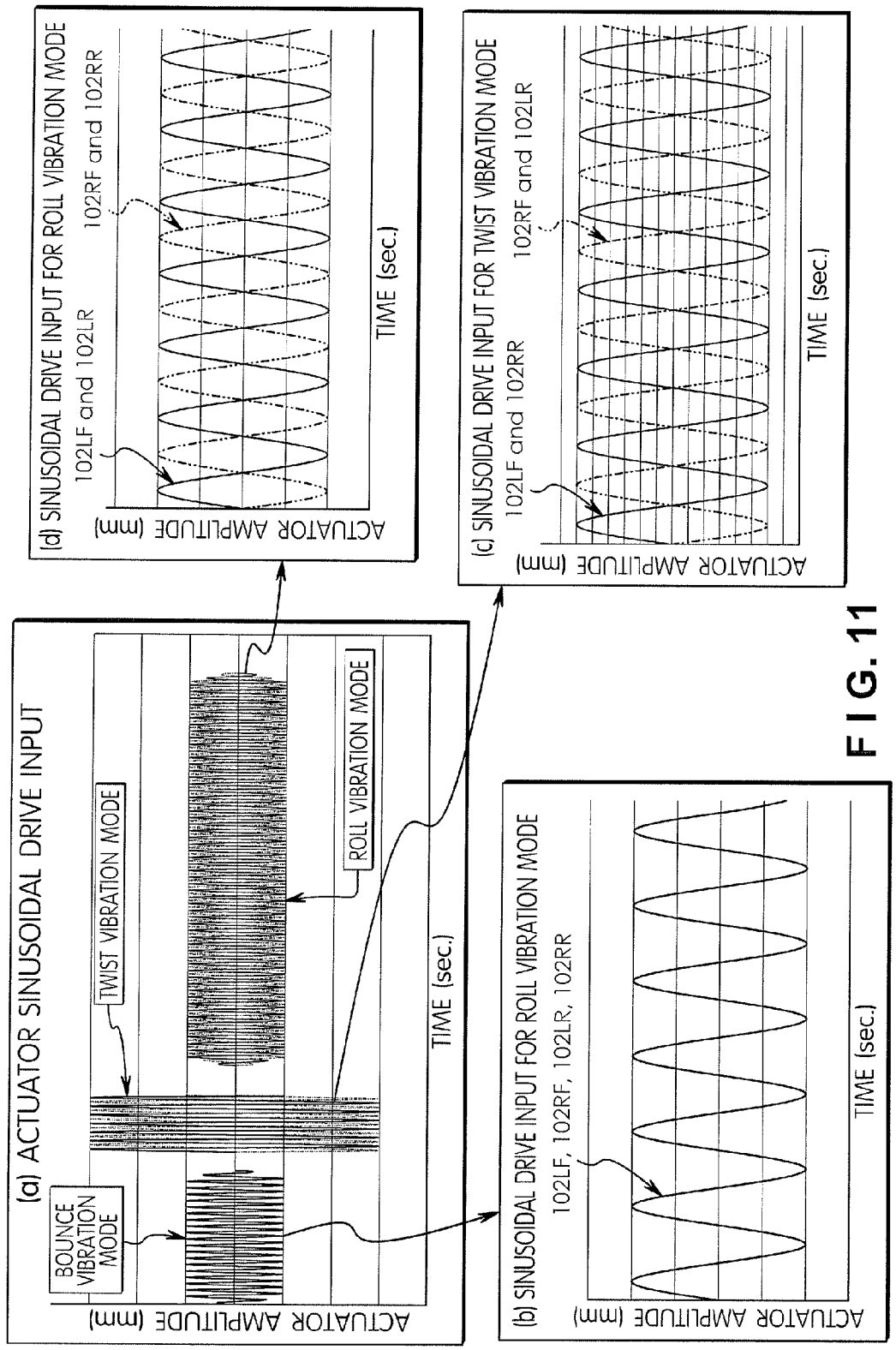
FIG. 11 is a series of drive input diagrams (a) to (d) illustrating examples of sinusoidal drive inputs for hydraulic actuators to apply the cyclic load inputs to the rear bed assembly in the truck rear bed road load durability testing method in accordance with the illustrated embodiment.

In step S50, the controller or the like (hydraulic actuators control unit), which is operatively connected to the hydraulic actuators 102LF, 102RF, 102LR and 102RR, controls the hydraulic actuators 102LF, 102RF, 102LR and 102RR according to the sinusoidal drive inputs calculated in step S40. FIG. 11 illustrates examples of waveforms for the sinusoidal drive inputs (hydraulic actuator amplitudes or strokes) applied to the rear bed assembly 1 according to the illustrated embodiment. More specifically a diagram (a) of FIG. 11 shows an overall sinusoidal drive inputs for controlling the hydraulic actuators 102LF, 102RF, 102LR and 102RR, and diagrams (b) to (c) show enlarged views of the sinusoidal drive inputs in the bounce vibration mode, the twist vibration mode, and the roll vibration mode, respectively. As shown in the diagram (a) of FIG. 11, the sinusoidal drive inputs for controlling control the hydraulic actuators 102LF, 102RF, 102LR and 102RR are formed based on the fatigue damage calculation in step S30 for the bounce vibration mode, the twist vibration mode and the roll vibration mode. More specifically, as shown in the diagram (b) of FIG. 11, the sinusoidal drive input is arranged so that all of the hydraulic actuators 102LF, 102RF, 102LR and 102RR are controlled to move (vibrate) together in the bounce vibration mode. On the other hand, in the twist vibration mode, the sinusoidal drive input is arranged so that a first set of diagonally arranged hydraulic actuators (i.e., the left-front hydraulic actuator 102LF and the right-rear hydraulic actuator 102RR) vibrate together and a second set of the diagonally arranged hydraulic actuators (i.e., the right-front hydraulic actuator 102RF and the left-rear hydraulic actuator 102LR) vibrate 180° out of phase with respect to the first set. Moreover, in the roll vibration mode, the sinusoidal drive input is arranged so that the right-front hydraulic actuator 102RF and the right-rear hydraulic actuator 102RR vibrate together 180° out of phase with respect to the left-front hydraulic actuator 102LF and the right-rear hydraulic actuators 102RR as shown in the diagram (d) of FIG. 11. Thus, the hydraulic actuators 102LF, 102RF, 102LR and 102RR are controlled to simulate the global vibration modes shown in the diagrams (a) to (d) of FIG. 6 as described above.

In step S60, the pseudo fatigue damage (bench test pseudo fatigue damage) due to the load imparted to the rear bed assembly 1 on the bench test in step S50 is calculated. In the illustrated embodiment, the amplitude of the hydraulic actuators 102LF, 102RF, 102LR and 102RR is limited to 2 mm for the first trial. Therefore, each time the hydraulic actuators 102LF, 102RF, 102LR and 102RR are operated to impart the cyclic vertical loads to the rear bed assembly 1 mounted on the bench test stand according to the sinusoidal drive inputs calculated previously, the detection results from the load cells 40 and other sensors mounted on the rear bed assembly 1 are collected. Then, pseudo fatigue damage is calculated based on the detection results from the load cells 40 and other sensors in the same manner as the pseudo fatigue damage was calculated based on the road load data in step S30. More specifically, the virtual data channels corresponding to the global vibration modes (the bounce vibration mode, the pitch vibration mode, the roll vibration mode and the twist vibration mode) are formed according to the formulas (1) to (4) as discussed above, and the pseudo fatigue damage on the bench test is calculated for each of the global vibration modes according to the conventional method based on the load data accumulated during the bench test.

Then, in step S70, pseudo fatigue damage comparison is conducted for each of the global vibration modes to substantially match the bench test pseudo fatigue damage calculated in step S60 with the road pseudo fatigue damage calculated in step S30. More specifically, the pseudo fatigue damage in the bench test calculated in step S60 is compared to the pseudo fatigue damage in the proving ground test calculated in Step S30. The comparison of the pseudo fatigue damages in step S30 and S60 are carried out for a prescribed distance. The pseudo fatigue damage of all four global vibration modes (the bounce vibration mode, the pitch vibration mode, the roll vibration mode and the twist vibration mode) is summed to equal the same road data pseudo damage. If the calculated pseudo fatigue damage in the bench test for each of the global vibration modes is sufficiently close to the pseudo fatigue damage in the proving ground test for that global vibration mode, the sinusoidal drive inputs are considered sufficient to simulate motions in the global vibration modes on the bench test. Thus, the sinusoidal drive inputs are set to be the target drive inputs used for the rear bed durability test. On the other hand, if the calculated pseudo fatigue damage in the bench test for each of the global vibration modes is not sufficiently close to the pseudo fatigue damage in the proving ground test for that global vibration mode in step S70, the process returns to step S40 to adjust the sinusoidal drive inputs (the amplitude of the motion of the hydraulic actuators 102LF, 102RF, 102LR and 102RR). The process in steps S40 to S70 is iterated until the pseudo fatigue damage in the bench test calculated in step S60 becomes substantially equivalent (sufficiently close) to the pseudo fatigue damage in the proving ground test calculated in step S30 for each of the global vibration modes.

FIG. 12 is a table showing an example of a comparison result of the pseudo fatigue damage calculated based on the road load data and the pseudo fatigue damage calculated based on the bench test load data for each of the global vibration modes after the sinusoidal drive inputs are determined according to the flowchart of FIG. 3. In this example, the input frequency is set to 7.5 Hz and the calculations of the pseudo fatigue damages are carried out for a prescribed distance of vehicle travel. As shown in FIG. 12, it is determined during the iterative process that pseudo fatigue damage of the pitch vibration mode is already present in the other modes of vibrations (e.g., the bounce vibration mode, the twist vibration mode and the roll vibration mode) in this example. Therefore, the final sinusoidal drive inputs in this example do not include the drive inputs for the pitch vibration mode.

Accordingly, the sinusoidal drive inputs determined as described above are arranged to achieve cyclic vertical load inputs imparted on the rear bed 10 on the bench stand, which achieve equivalent pseudo fatigue damage on the rear bed 10 as the vertical load input on the rear bed 10 during the proving ground test.

Truck Rear Bed Durability Bench Test

Once the sinusoidal drive inputs are determined according to the flowchart of FIG. 3 as described above, the sinusoidal drive inputs can be used to perform the rear bed durability test for sample rear beds having the same/similar shape and configuration as the rear bed 10. The load cells 40 disposed at the mounting points between the rear bed and the vehicle frame can be omitted from the sample rear bed assembly because the load cells 40 were provided in order to acquire the load input data for the purpose of developing the sinusoidal drive inputs. The sample rear bed assembly is then mounted onto the hydraulic actuators 102LF, 102RF, 102LR and 102RR, and the calculated sinusoidal drive inputs (target inputs) are applied to the sample rear bed assembly by controlling the hydraulic actuators 102LF, 102RF, 102LR and 102RR.

The precise method for determining the road load durability of the sample rear bed varies as each truck manufacturer has its internal standards for road load durability. For example, the road load durability of the sample rear bed can be determined based on spot separation, crack and deformation status of the sample rear bed observed visually and measured by an instrument such as a scale, and the like.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle or a bench test stand positioned on a flat level surface. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, advanced analysis tools may further be applied to the collected data to study interactions between the vehicle frame 30 and the rear bed 10 in frequency domain. The global vibration modes can be separated and analyzed more accurately and the frequency of each vibration mode can be used in creating an advanced block cycle test. Also, the use of random vibration with a broader frequency spectrum as the input for the bench test can be considered. Moreover, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method for testing road load durability of a rear bed of a truck, the method comprising:
   acquiring road load data indicative of loads imparted on the rear bed while the truck is traveling on a proving road;
   calculating road pseudo fatigue damage on the rear bed for a plurality of global vibration modes based on the road load data;
   acquiring bench test load data indicative of loads imparted on the rear bed while a cyclic input corresponding to the global vibration modes is applied to a rear bed assembly mounted on a bench test stand;
   calculating bench test pseudo fatigue damage on the rear bed for the global vibration modes based on the bench test load data;
   adjusting the cyclic input to achieve the bench test pseudo fatigue damage substantially equivalent to the road pseudo fatigue damage for the global vibration modes; and
   performing a durability bench test of the rear bed by applying the cyclic input to the rear bed assembly mounted on the bench test stand.

2. The method according to claim 1, wherein
the acquiring of the road load data includes acquiring input loads detected by a plurality of load cells disposed between the rear bed and a vehicle frame of the truck.

3. The method according to claim 2, wherein
the calculating of the road pseudo fatigue damage includes calculating the road pseudo fatigue damage with respect to vertical components of the input loads detected by the load cells.

4. The method according to claim 2, wherein
the calculating of the road pseudo fatigue damage includes incorporating the input loads detected by the load cells into a virtual input load corresponding to the global vibration mode, and analyzing the virtual input load in frequency and time domains to determine the road pseudo fatigue damage on the rear bed for the global vibration mode.

5. The method according to claim 1, wherein
the acquiring of the bench test load data includes acquiring input loads detected by a plurality of load cells disposed between the rear bed and a vehicle frame of the rear bed assembly.

6. The method according to claim 5, wherein
the calculating of the bench test pseudo fatigue damage includes calculating the bench test pseudo fatigue damage with respect to vertical components of the input loads detected by the load cells.

7. The method according to claim 5, wherein
the calculating of the bench test pseudo fatigue damage includes incorporating the input loads detected by the load cells into a virtual input load corresponding to the global vibration mode, and analyzing the virtual input load in frequency and time domains to determine the bench test pseudo fatigue damage on the rear bed for the global vibration mode.

8. The method according to claim 1, wherein
the global vibration modes include at least one of a bounce vibration mode, a pitch vibration mode, a twist vibration mode, and a roll vibration mode.

9. The method according to claim 1, wherein
the acquiring of the bench test load data includes independently applying a plurality of sinusoidal load components of the cyclic input to a plurality of load input positions of the rear bed assembly, respectively, in a vertical direction to reproduce the global vibration mode.

10. A method for testing road load durability of a rear bed of a truck, the method comprising:
   calculating road pseudo fatigue damage on the rear bed based on road load data indicative of loads imparted on the rear bed while the truck is traveling on a proving road;
   determining a cyclic input applied to a rear bed assembly mounted on a bench test stand with the rear bed assembly being separated from at least a cab of the truck so that bench test pseudo fatigue damage on the rear bed that is substantially equivalent to the road pseudo fatigue damage is achieved by the cyclic input; and
   performing a durability bench test of the rear bed by applying the cyclic input to the rear bed assembly mounted on the bench test stand with the rear bed assembly being separated from at least the cab.

11. The method according to claim 10, wherein
the calculating of the road pseudo fatigue damage includes
calculating the road pseudo fatigue damage with respect to a plurality of global vibration modes determined based on the road load data, and
the determining of the cyclic input includes determining the cyclic input to the rear bed assembly that simulates the global vibration mode.

12. The method according to claim 11, wherein
the determining of the cyclic input includes determining a plurality of sinusoidal load components of the cyclic input applied to a plurality of load input positions of the rear bed assembly, respectively, in a vertical direction to reproduce the global vibration mode.

13. The method according to claim 11, wherein
the global vibration modes include at least one of a bounce vibration mode, a pitch vibration mode, a twist vibration mode, and a roll vibration mode.

14. A system for testing road load durability of a rear bed of a truck, the system comprising:
a left-front hydraulic actuator having a left-front attachment part configured and arranged to be coupled to a left-front portion of the rear bed assembly to apply a vertical load input to the left-front portion of the rear bed assembly;
a right-front hydraulic actuator having a right-front attachment part configured and arranged to be coupled to a right-front portion of a rear bed assembly to apply a vertical load input to the right-front portion of the rear bed assembly;
a left-rear hydraulic actuator having a left-rear attachment part configured and arranged to be coupled to a left-rear portion of a rear bed assembly to apply a vertical load input to the left-rear portion of the rear bed assembly;
a right-rear hydraulic actuator having a right-rear attachment part configured and arranged to be coupled to a right-rear portion of a rear bed assembly to apply a vertical load input to the right-rear portion of the rear bed assembly;
a restraint mechanism configured and arranged to limit a relative displacement between at least one adjacent pair of the left-front, right-front, left-rear and right-rear hydraulic actuators; and
a hydraulic actuators control unit configured to independently control the left-front, right-front, left-rear and right-rear hydraulic actuators to apply a prescribed cyclic input to the rear bed assembly.

15. The system according to claim 14, wherein
the restraint mechanism laterally extends at least one of between the left-front and right-front hydraulic actuators and between the left-rear and right-rear hydraulic actuators.

16. The system according to claim 14, wherein
the restraint mechanism includes
a center link member having a pair of rod attachment portions, and pivotally coupled to a fixed member about a center pivot axis disposed between the rod attachment portions, and
a pair of rod members each having an outer end and an inner end with the outer end being configured and arranged to be pivotally coupled the rear bed assembly and an inner end being pivotally coupled to a respective one of the rod attachment portions of the center link member.

17. The system according to claim 14, wherein
the restraint mechanism longitudinally extends at least one of between the left-front and left-rear hydraulic actuators and between the right-front and right-rear hydraulic actuators.

18. The system according to claim 17, wherein
the restraint mechanism includes a rod member having first and second ends with the first end being configured and arranged to be pivotally coupled to the rear bed assembly and the second end being pivotally coupled to a fixed member.

19. The system according to claim 14, wherein
the hydraulic actuators control unit is configured to independently control the left-front, right-front, left-rear and right-rear hydraulic actuators according to prescribed sinusoidal drive inputs to achieve the prescribed cyclic input to the rear bed assembly.

20. The system according to claim 14, further comprising
a cyclic input calculating unit configured to
determine road pseudo fatigue damage on the rear bed based on road load data indicative of loads imparted on the rear bed while the truck is traveling on a proving road, and
determine the prescribed cyclic input so that bench test pseudo fatigue damage on the rear bed that is substantially equivalent to the road pseudo fatigue damage is achieved by the cyclic input.

* * * * *